Oct. 29, 1940.    J. T. HAYWARD ET AL    2,219,312
METHOD FOR CONTROLLING THE PROPERTIES OF DRILLING FLUIDS
Filed Oct. 24, 1938    2 Sheets-Sheet 1
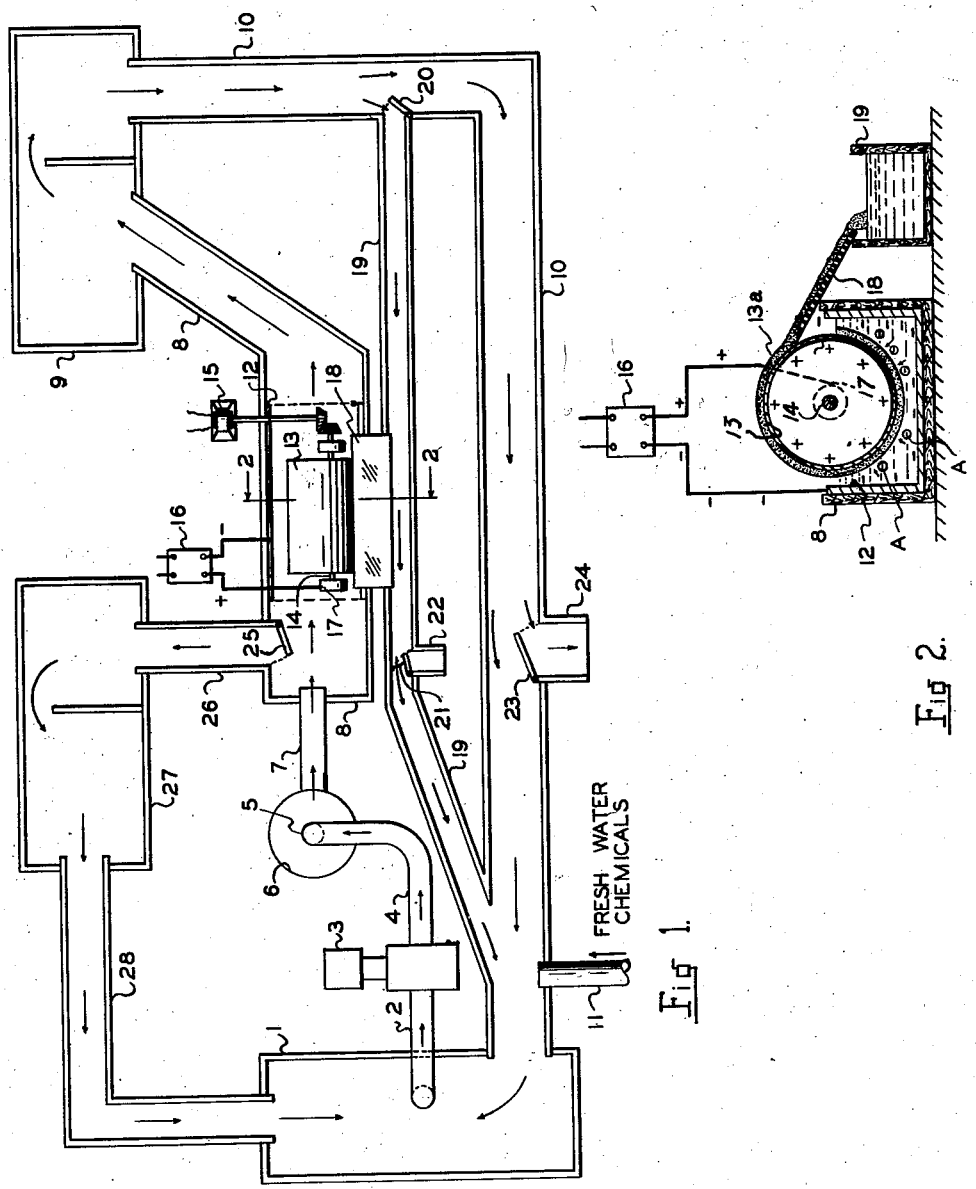
INVENTORS.
JOHN T. HAYWARD
BY E. E. HUEBOTTER
ATTORNEY

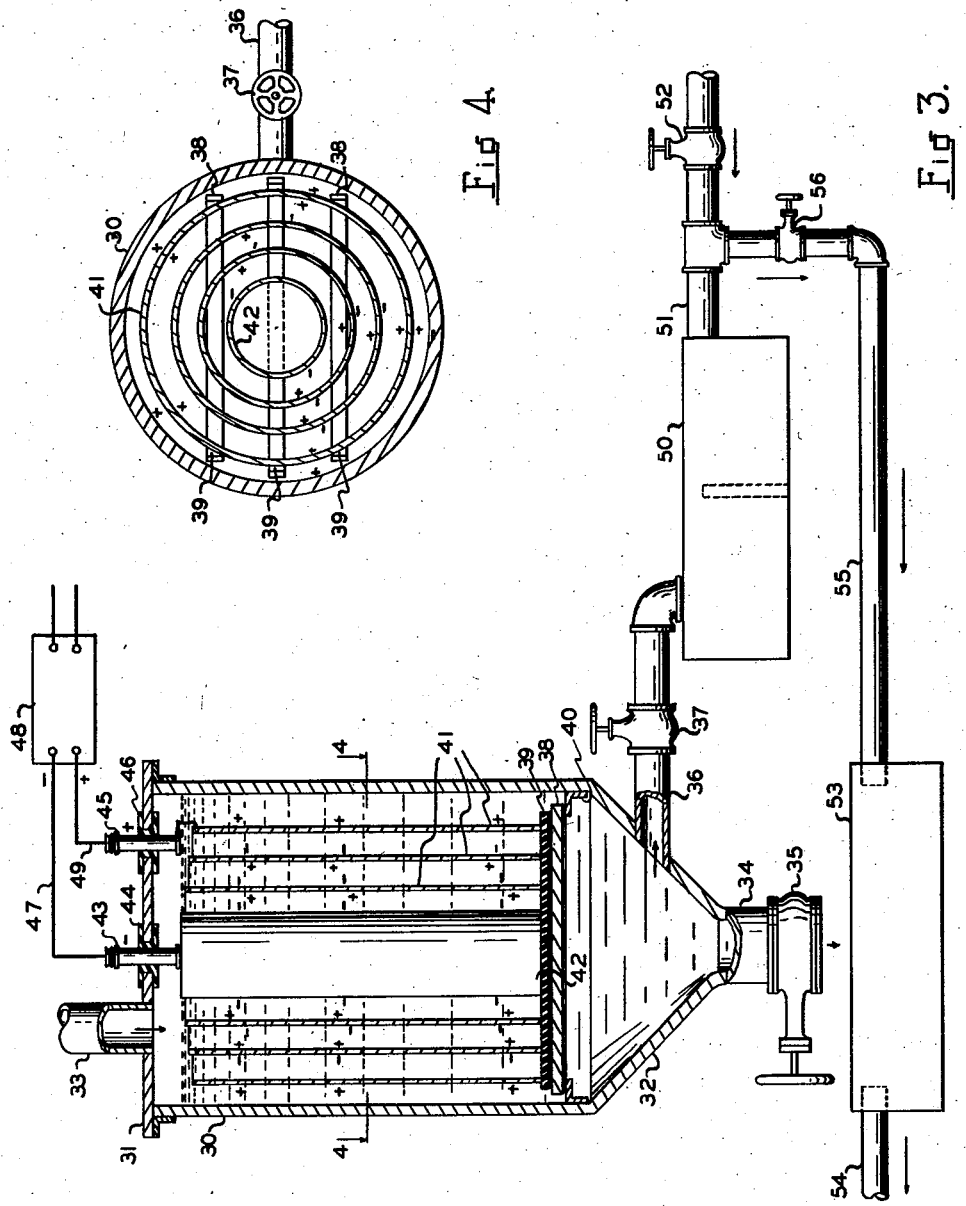

Patented Oct. 29, 1940

2,219,312

UNITED STATES PATENT OFFICE 2,219,312

METHOD FOR CONTROLLING THE PROPERTIES OF DRILLING FLUIDS

John T. Hayward and Earl E. Huebotter, Tulsa, Okla.; said Huebotter assignor to National Lead Company, a corporation of New Jersey Application October 24, 1938, Serial No. 236,648

9 Claims. (Cl. 255—1)

This invention relates to methods of controlling the properties of drilling fluids and particularly to electrical methods for controlling the physical properties of mud fluids employed in the drilling of wells.

In the drilling of oil, gas, sulfur or water wells, particularly by the rotary method, a hydraulic fluid ordinarily is forced by means of a pump down through the drill pipe, around the bit, up the annular space between the drill pipe and the wall of the well bore, and out at the surface of the ground. At the surface of the ground, the fluid ordinarily passes through a series of ditches and settling pits back to the pump intake for recirculation through the well.

The hydraulic fluid serves several important functions in connection with the drilling operation. Its primary function is to pick up cuttings in the drilling zone and carry them from the well. Its other more important functions are to cool and clean the drill bit; to lubricate the drill pipe; to prevent settling of cuttings when circulation of the fluid ceases; to thereby prevent sticking of the drill pipe; to exert a hydrostatic pressure against the subterranean strata traversed by the well bore, to thereby prevent inflow of high pressure oil, gas or water which may be encountered; and to seal the strata forming the wall of the well bore to prevent loss of fluid into these strata.

To perform these functions satisfactorily, close control must be exercised of the physical properties, particularly of the viscosity, of the drilling fluid which must ordinarily be controlled between very narrow limits. Generally speaking, the viscosity must be great enough to permit the fluid to lift the cuttings and carry them from the well, and, at the same time, must be low enough to permit the fluid to be easily pumpable and to allow rapid settling out of cuttings and escape of entrained gas, when the fluid is returned to the surface of the ground. Otherwise, cuttings will remain in suspension in the fluid and will continue to concentrate therein during the repeated circulation of the fluid through the well, resulting in numerous drawbacks in the drilling operation.

The hydraulic fluids used in drilling consist generally of a colloidal suspension of finely ground clays or similar earthy matter in water, to which may be added, in some circumstances, inert, non-colloidal solids of relatively high specific gravity, such as barium sulfate, iron oxide and the like, to impart greater weight characteristics to the fluid, and chemicals, such as sodium tannate, tannic acid, gallic acid, sodium phosphates and the like, which are useful in controlling various characteristics of the fluids.

The viscosity of the drilling fluid normally depends upon the concentration of colloidal clay material therein, and such material may be obtained naturally from the earth materials cut out by the drill or may be supplied to the fluid from extraneous sources. Proper control of the colloidal content is complicated in practice by the continual removal from the fluid of the colloidal clay particles through the filtering action upon the fluid by the porous formations traversed by the well, resulting in the deposit of a mud sheath on the wall of the well. As this wall sealing action is an important function of the drilling fluid, it must be taken into account in the control of the properties of the drilling fluid, particularly its viscosity, which, as noted above, is primarily a function of the colloidal clay content of the fluid.

It will be evident from the foregoing, therefore, that the ideal hydraulic fluid is one which, while in the well, will have a relatively high viscosity, that is, relatively high colloidal content, in order to efficiently perform the functions required of it there, but which, when returned to the surface of the ground and conducted through the settling pits, will have a relatively low viscosity in order to permit rapid settling out of cuttings and sand and escape of any entrained gas.

No satisfactory method has heretofore been found or provided for producing these ideal conditions and as a result, the general practice has been to fix upon some particular mean viscosity value for the mud fluid throughout its circulation. This has proven generally unsatisfactory due to the fact that after a period of circulation the mud fluid becomes too viscous to drop the cuttings properly and the content of solids in the fluid will build up to such a point as to cause excessive wear of the circulating pumps and to increase the hazard of sticking the drill pipe in the well. The increased viscosity of the mud is counter-acted to some extent by adding chemicals thereto, but it is found that the capacity of the mud fluid to react to the chemicals is limited and after one or two additions of chemicals, the viscosity will not be altered materially by further additions of chemicals. When this condition is reached, very often the entire quantity of mud fluid in circulation must be discarded and a fresh supply of mud fluid made up, resulting in added expense for materials and labor, loss of valuable drilling time and other disadvantages. Again, when certain chemicals or water are added to the cuttings-laden fluid leaving the well, the viscosity may be reduced sufficiently to drop out the cuttings and release entrained gas. However, since such chemicals or water are dissolved in the fluid, they remain therein and require the addition of greater quantities of colloidal clays to counteract their viscosity reducing effect before return of the fluid to the well, and result in other disadvantageous conditions well recognized in the drilling art.

It is known that the colloidal materials contained in hydraulic fluids, such as are above described, bear appreciable electrical charges, generally negative charges, and the present invention employs this characteristic property of such fluids to provide a novel method for controlling the important physical properties thereof.

The new method consists generally in flowing the hydraulic fluids, laden with well cuttings and other foreign matter as it leaves a well, through an electric field created between spaced electrodes, and controlling the direction of the field relative to the sign of the charge on the colloidal particles to cause deposition of these particles on one of the electrodes with the result that a separation is effected between the relatively colloidal and the relatively non-colloidal portions of the fluid. The non-colloidal portion of the fluid, which is generally the aqueous phase, and consists of the water, non-colloidal clays, cuttings, sand and other foreign matter, being thus deprived of the colloidal viscosity producing material, is thereby greatly reduced in viscosity, with the result that the sand, cuttings and other foreign matter will settle out rapidly therefrom. The aqueous non-colloidal portion of the fluid, which is thus refined, is then re-combined with the separated colloidal material to restore the hydraulic fluid to its original character and physical properties. Of the proportions of the colloidal and non-colloidal materials which are re-combined may be varied as desired to alter the physical character of the fluid which is returned to the well.

The action of the colloidal particles in the applied electric field is due to the phenomenon of electrophoresis, which is defined as the migration of suspended solid, liquid or gaseous colloidal particles under the influence of an external electromotive force. The charged particles will migrate in a direction in accordance with the direction of the field and with the sign of the charge on the particles. Thus, if the direction of the field is considered as from the positive to the negative electrode, negatively charged particles will move oppositely to the direction of the field and toward the positive electrode, while positively charged particles will move in the reverse direction. The colloidal particles of mud fluids, such as above described, are generally negatively charged, and when such mud fluids are passed through an electric field established between spaced electrodes, the colloidal particles will move to the positive electrode and deposit thereon.

Therefore, it is a principal object of this invention to provide an electrical method for controlling the properties of drilling fluids.

Another object is to provide an electrical method for continuously controlling the colloidal properties of drilling fluids.

Still another object is to provide an electrical method for purifying drilling fluids.

An additional object is to provide an electrical method for separating drilling fluids into a relatively colloidal portion and a relatively non-colloidal portion containing foreign matter to thereby permit easy purification of the drilling fluid and control of its desirable properties.

A more specific object is to provide an electrical method for controlling the properties of drilling fluids by subjecting the fluids to an applied electric field, whereby colloidal components are separated from noncolloidal components and the properties of the fluids altered by altering the proportions in which the components are re-combined.

An additional important object is to provide an electrical method for controlling the viscosity of drilling fluids.

Still another specific object of this invention is to provide a method for purifying drilling fluids containing foreign matter by first decreasing the viscosity of the drilling fluids to permit easy separation therefrom of foreign matter, and thereafter increasing the viscosity of the purified drilling fluid to a desired value for use in drilling operations.

A further specific object is to provide a method for controlling the salt water content of drilling fluids and for controlling the content of dissolved foreign matter generally.

Other and more specific objects will become apparent from the following detailed description, together with the accompanying drawings, which illustrate more or less diagrammatically several forms of apparatus suitable for successfully practicing this invention for the accomplishment of the aforesaid several objects.

In the drawings:

Fig. 1 illustrates diagrammatically the layout of apparatus suitable for practicing a continuous or cyclic modification of this invention.

Fig. 2 is a transverse section taken along line 2—2 of Fig. 1, to show in somewhat enlarged scale some of the details of electrical apparatus employed in this invention.

Fig. 3 illustrates apparatus for practicing another modification of this invention, and Fig. 4 is a transverse section taken along line 4—4 of Fig. 3.

Referring particularly to Figs. 1 and 2, the numeral 1 represents a conventional suction pit containing a supply of mud fluid for use in well drilling. The fluid is drawn through a suction pipe 2 by a pump 3 and discharged through a pipe 4 into the interior of the conventional hollow drill pipe 5 which extends into the bore of a well, the wall of which is designated by the numeral 6. The pump forces the fluid through drill pipe 5 to the bottom of the well where it emerges through the usual openings in a drill bit, not shown, and picks up the drill cuttings and, under the pressure of the pump, carries the cuttings upwardly through the annular space between the outside of drill pipe 5 and the wall 6 of the well bore to the top of the well where the fluid and the cuttings carried thereby are discharged through a pipe 7 into the usual mud ditch 8, through which the stream of mud fluid flows into a settling pit 9 of conventional construction. In the settling pit 9, cuttings, sand and entrained gas are separated from the mud fluid by gravity settling and the purified mud fluid over-flows into a return ditch 10, which conducts the fluid back to suction pit 1 for re-circulation through the well. Fresh water and chemicals may be supplied to the mud fluid entering suction pit 1 by means of a pipe 11, the discharge end of which is positioned at a point in ditch 10 adjacent to its point of entry into suction pit 1.

The foregoing describes, more or less generally, the conventional mud circulation system of well drilling operations. It will be understood that conventional "shale shakers" and other supplementary apparatus for the separation of the larger particles of the cuttings from the mud fluid may be employed in the system in the ordinary manner.

The mud fluid, as noted above, ordinarily consists of a water suspension of finely ground clay, obtained either from the well cuttings, or extraneously supplied, and includes varying amounts of colloidal clay particles such as finely ground bentonite. The suspension of these clays in water forms a viscous slurry, which, under ideal conditions, should be thick enough to support the cuttings in the well, but which should quickly drop the cuttings when permitted to flow the settling pits at the surface of the ground. However, as the cuttings, at least part of which become very finely ground by the action of the drill bit, become mixed with the mud fluid in the well, the mud fluid becomes progressively thicker and more viscous, with the result that sand, and other cuttings and gas are so tightly occluded within the mud fluid that they will not separate by settling in the pits, and will continue to circulate with the mud fluid, thus progressively increasing its thickness and viscosity to the point where it becomes difficult to pump and cause grave danger of sticking of the drill pipe, while the sand particles may produce very serious abrasion of the pumps and fittings. Also when gas is present, its retention in the drilling fluid causes "gas cutting" with resulting lightening of the specific gravity of the mud fluid to the point where the hydrostatic head of the column of mud fluid in the well may decrease below that prevailing in underground reservoirs of oil, gas or water, which may be encountered, and result in the very undesirable "blow-outs" familiar to the drilling industry.

To obviate these difficulties, the present invention provides novel method steps whereby the viscosity of the mud fluid leaving the well is reduced at one point sufficiently to permit the mud fluid to quickly drop cuttings and sand and to release any entrained gas, and thereafter, the viscosity is restored to the desired value before the mud fluid is returned to the well. The reduction in viscosity is effected by dividing the fluid into relatively colloidal and relatively non-colloidal portions by removing some or all of the colloidal matter from the fluid, whereupon, the non-colloidal portion, which will contain the cuttings, sand and gas, will be reduced in viscosity sufficiently to permit quick settling out of these materials. The separated colloidal matter is then re-combined with the purified non-colloidal fluid in such proportions as are necessary to restore the mud fluid to the original or to any other desired viscosity value.

The novel steps of the method of this invention are conducted as follows: A portion of mud ditch 8, between the point of entry therein of mud fluid from pipe 7 and settling pit 9, is lined with a metal plate 12, having good electrical conductivity. A cylindrical drum 13, also constructed of a suitable conductor metal, is mounted on a shaft 14 and suitably journaled to rotate in the mud fluid flowing over plate 12. The drum 13 is spaced from plate 12 and positioned so that only a portion of the cylindrical surface thereof is continuously immersed in the mud fluid. The drum is rotated by means of a motor 15, connected to shaft 14 by any conventional driving connection. Drum 13 is suitably electrically insulated from the ground. One terminal of source of direct current 16, such as a battery, generator or rectifier, is connected to the metal surface of drum 13 by a suitable brush connection, shown generally at 17, and the other terminal of the source of direct current is connected to plate 12, which is also electrically insulated from the ground. Ditch 8, which is ordinarily constructed of wood, may serve as a suitable insulator, or special electrical insulation may be provided between plate 12 and the wall of ditch 8.

This apparatus is employed as follows: As previously noted, it is known that the colloidal particles of the mud fluid bear an appreciable electric charge, generally of negative sign. Therefore, the negative terminal of direct current source 16 is connected to plate 12 and the positive terminal to drum 13, these elements then becoming spaced electrodes, negative and positive, respectively. An electromotive force is then applied to the drum and plate by means of current source 16, and an electric field is thereby created through the mud fluid between these electrodes. Due to resulting electrophoresis, the negatively charged colloidal particles A of the mud fluid, shown in exaggerated size in Fig. 2, will migrate toward the positive electrode, drum 13, and will deposit thereon, thereby effecting removal of these viscosity producing materials from the mud fluid. By continuously rotating drum 13 as the stream of mud fluid flows over plate 12 toward settling pit 9, the colloidal materials are continuously removed from the fluid in the form of a deposited layer 13a on the surface of drum 13. As the deposit of colloidal material emerges from the mud fluid through the rotation of the drum, it is scraped from the surface of the drum by means of a suitably positioned scraper 18, constructed preferably of non-conducting material, such as hard rubber or the like, and is deposited thereby in a by-pass ditch 19, which by-passes a portion of return ditch 10 and communicates at one end with ditch 10 through an adjustable gate 20. The other end of by-pass ditch 19 enters return ditch 10 at a point adjacent to suction pit 1. The cleaned surface of drum 13 is then re-immersed in the mud fluid in order that more colloidal material may deposit thereon. Since this operation is continuous, colloidal material will thus be continuously removed from the mud fluid.

The mud fluid, from which colloidal matter has thus been removed, now consists largely of a non-colloidal suspension of cuttings, sand and gas in water and upon reaching settling pit 9, quickly drops the larger portion of these materials, since the previous removal of the colloidal matter has reduced the viscosity of the fluid to such a point that the suspended material will no longer be supported by the fluid. Sufficient settling time is provided in settling pit 9 to permit the suspended materials to effectively settle out of the fluid, and the refined fluid then returns through ditch 10 to suction pit 1. A portion of the refined fluid, in an amount varying with each particular case, is diverted from ditch 10 through bypass ditch 19 by suitable adjustment of gate 20, which may be a valve, proportioning weir, or any other device suitable for this purpose. The diverted portion of the fluid flows through by-pass ditch 19 and flushes therefrom the colloidal matter previously scraped from drum 13, and washes this matter into return ditch 10 and thence into suction pit 1. The mixture of materials thus entering suction pit 1, produces a fresh mud fluid of substantially the original properties. To assure effective re-combining of the colloidal matter with the fluid in ditches 10 and 19, any suitable mechanical mixing or agitating means, not shown, may be employed at the junction of these fluids.

It should be understood that only under ideal conditions will all of the colloidal matter be removed from the mud fluid in this way. Generally, and in fact preferably, only sufficient colloidal matter will be removed from the mud fluid to assure efficient settling out of the foreign matter from the fluid in the settling pits and to maintain the fluid returning to the well at relatively uniform viscosity and other desirable properties. In some cases colloidal matter may be removed from the system by diverting a portion of the stream in by-pass ditch 19 through a diversion gate 21 into a diversion ditch 22. This may be desirable, either when a thinner mud is desired at some stage of the drilling, or when the concentration of colloidal material builds-up as a result of the drilling-through of a strata of colloidal matter. On the other hand, if it is desired to increase the relative concentration of colloidal matter in the mud fluid, some of the non-colloidal fluid, that is, the aqueous phase, may be discarded from the system by diversion of a portion of the stream from return ditch 10 through a gate 23 and a ditch 24. This may be desirable particularly when the mud fluid, while in the well, has encountered a flow of water, especially salt water, which dilutes and thins the mud fluid below the desired viscosity value. This provides an especially important way of controlling the properties of the mud fluid to be returned to the well.

The reduction of the volume of the aqueous phase of the mud fluid to control the properties thereof may be effectively accomplished in another way which employs the action of the electric field directly to this end. For example, when the mud fluid entering ditch 8 from the well contains excessive amounts of salt water, as through contamination in the well, substantial quantities of the aqueous phase of the mud fluid, which will include the salt water, may be separated from the fluid by reversing the direction of the electric field applied to the mud fluid between plate 12 and drum 13. That is, the drum 13 is made negative and plate 12 positive. It is found that, by electrophoresis, the aqueous phase will migrate toward the drum and collect thereon by a combination of the electrophoretic effect and capillary attraction or surface tension effect. The rotation of the drum will then continuously remove an appreciable quantity of the aqueous phase from the fluid in the form of a deposited layer, this layer being then scraped from the drum by scraper 18 and deposited in ditch 19. Gate 21 will be opened wide to block the flow of the removed aqueous phase into ditch 10 and will direct all of this material into diversion ditch 22, whereby it is discarded from the system. Gate 20 will be closed at the same time, so that all colloidal matter will flow directly from settling pit 9 to suction pit 1. If desired, fresh water may be added through pipe 11 to the fluid in ditch 10 to replace the quantity of the aqueous phase removed by drum 13. In this way dissolved foreign matter may be removed from the mud fluid and the physical properties of the mud fluid controlled. In this modification, the action of the electric field will not only cause migration of the aqueous phase to drum 13 but will also repel the colloidal particles from the drum surface so that the aqueous phase will be relatively free of colloidal matter. The colloidal matter will tend to deposit on plate 12, but since the plate is stationary, the flow of the mud fluid across plate 12 will continuously wash the major portion of the deposited colloidal matter therefrom, particularly when the layer of colloidal matter has built-up to an appreciable thickness. Should the layer of colloidal matter on plate 12 become sufficiently thick to interfere with the flow of fluid through the ditch 8, it will only be necessary to reverse the direction of the electric field or to interrupt it momentarily, thus releasing the attraction of the colloidal deposit to plate 12, whereupon such deposit will readily be flushed from the plate by the action of the flowing stream of mud fluid.

To meet special conditions which may be encountered, fresh water, chemicals, or additional colloidal or non-colloidal matter may be added through pipe 11 to the fluid in return ditch 10 as it enters the suction pit 1.

Instead of subjecting the entire mud stream to the electric field for the purposes described, it may be found that the properties of the mud fluid may be suitably controlled by treating only a part thereof, that is, only a part of the mud fluid need be subjected to the novel treatment herein described, while the remainder may be treated solely by settling in the conventional manner. In this case, a portion of the mud stream entering ditch 8 from pipe 7 is diverted through a gate 25, positioned in ditch 8 at a point preceding plate 12 and drum 13, and is discharged through a ditch 26 into a separate settling pit 27 where the fluid is subjected to the conventional settling treatment and the settled fluid returned through a ditch 28 to suction pit 1 where it rejoins the electrically treated portion of the fluid entering from ditch 10. In this modification, the relative proportions of the mud streams may be varied widely. Generally, only as much of the mud stream will be subjected to the electrical treatment as is necessary to provide a stream entering the well which will have the desired viscosity and other properties required in that particular well, and in which the percentage of undesirable cuttings, sand, dissolved foreign matter and the like will be maintained below an amount which would be detrimental to the drilling operation.

In all of the foregoing modifications, it should be understood that the flow of the mud streams through the several ditches and settling pits is preferably by gravity flow, the relative levels and slopes of the ditches and pits being suitably arranged to provide continuous flow of liquid as described. Of course, pumps and other mechanical transfer devices may be used but because of the viscous and abrasive nature of mud fluids generally, the gravity flow is ordinarily to be preferred.

In all of the above modifications, the electromotive force applied to the electrodes, that is, plate 12 and drum 13, will vary, depending largely upon the rate at which it is desired to withdraw colloidal matter or aqueous matter from the fluid, and upon the composition of the fluid to be treated. In most cases, from 5 to 15 volts per inch of distance between the electrodes will be sufficient to accomplish the desired purposes.

From the foregoing it will be seen that this invention provides an electrical method of controlling continuously the properties of mud fluids such as those used in well drilling.

Figs. 3 and 4 illustrate a form of apparatus which may be employed successfully in practicing this invention by a batch, or batch-continuous process. The apparatus consists of a cylindrical metal tank 30, fitted with a cover 31 and having a cone bottom 32. A pipe 33 communicates with the interior of tank 30 through cover 31 and provides means for admission of mud fluid into the tank. The lower end of cone bottom 32 of the tank communicates with an outlet pipe 34 fitted with a gate valve 35. A pipe 36, in which is mounted a valve 37, communicates with the interior of cone bottom 32 and extends laterally therefrom. A plurality of spaced bars 38, each over-laid with electrical insulating strips 39, are positioned horizontally across the interior of tank 30 just above cone bottom 32. The ends of bars 38 are supported on angle irons 40 affixed to the interior of tank 30. A plurality of concentric cylinders 41—41, constructed preferably of a metal which is a good electrical conductor, are vertically positioned within tank 30 and supported on bars 38 and insulating strips 39. A cylindrical electrode 42, preferably though not necessarily closed at its ends, is similarly positioned within the innermost one of cylinders 41. Electrode 42 and cylinders 41 are preferably equidistantly spaced from each other. An electrical connector 43 is connected to the top of electrode 42 and extends through an opening in cover 31, the opening being lined with an insulating bushing 44. A similar connector 45 is connected to the outermost one of cylinders 41 and also extends through cover 31 through an insulating bushing 46. Connector 43 is connected by a lead 47 to the negative terminal of a direct current source 48, while connector 45 is connected by a lead 49 to the positive terminal of current source 48. Pipe 36 discharges into a settling pit 50, from which extends an overflow pipe 51 fitted with a valve 52. Pipe 34 discharges through valve 35 into a tank 53 which has an overflow pipe 54. A pipe 55, fitted with a valve 56, is connected at one end to pipe 51 at a point between pit 50 and valve 52 and at the other end discharges into tank 53.

Mud fluid of the general character previously described is pumped into tank 30 through pipe 33 and discharged through pipe 36 and valve 37 into settling pit 50. Valve 35 is held closed. The mud fluid is pumped into tank 30 at a rate sufficient to keep the tank filled above the upper edges of cylinders 41—41. A suitable electromotive force is applied from current source 48 to the fluid in the tank, the E. M. F. being applied to the outermost one of cylinders 41 and to electrode 42, thereby creating an electric field between these electrodes. The direction of the field will be from the outermost one of cylinders 41 to electrode 42, the cylinder 41 being the positive electrode and electrode 42 the negative electrode. The intermediate ones of cylinders 41 will become positively charged on their internal surfaces and negatively charged on their external surfaces, as indicated in the drawings. With the E. M. F. applied in this manner, the negatively charged particles of colloidal matter in the mud fluid will migrate toward and deposit on the inner surfaces of all of the cylinders 41 and also upon the outermost surface of outermost electrode or cylinder 41. In this manner, sufficient colloidal matter is removed from the mud fluid passing through tank 30 so that the non-colloidal aqueous phase containing sand, cuttings and the like will be reduced in viscosity sufficiently to cause rapid settling-out of these impurities in pit 50.

The colloidal matter deposited on cylinders 41 will be removed at intervals to prevent excessive deposits thereon and to prevent sloughing of the colloidal matter into the aqueous phase of the fluid passing to pit 50. The removal of colloidal matter from the cylinders 41 is effected by reversing the direction of the field or by simply interrupting the flow of current from current source 48. Valve 35 will be opened and valve 37 closed, while the flow of mud fluid into the tank from pipe 33 will be halted. Upon reversal or interruption of the electric field, the deposited layers of colloidal matter will slough from cylinders 41 and drop into cone bottom 32, whence the matter is discharged through pipe 34 and valve 35 into tank 53. The removal of colloidal matter from the cylinders 41 may be assisted by washing the cylinders with a stream of fresh water introduced through pipe 33.

The aqueous phase of the mud fluid, freed of the undesirable sand, cuttings and the like, will collect as a supernatant layer in pit 50 from which it may be withdrawn through pipe 51 and valve 52 and discarded from the system, or all or a portion thereof may be passed through pipe 55 into tank 53 by opening valve 56 and closing, or partially closing, valve 52. The thus purified aqueous phase, which is passed to tank 53, is remixed therein with the colloidal matter received from tank 30 and the resulting colloidal fluid is returned to a well through pipe 54.

By this arrangement, the properties of the mud fluid may be readily controlled by regulating the proportions of aqueous phase and colloidal matter employed to make up the mud fluid in tank 53.

It will be seen that by the various apparatus modifications herein described the process of this invention may be conducted as a batch, batch-continuous, or continuous operation for the control of the properties of well fluids, particularly of mud fluids for drilling purposes.

Numerous other modifications and alterations may be made in the apparatus and process steps of this invention. For example, instead of employing a single drum having a continuous cylindrical surface, such as drum 13, a series of drums with corresponding plates 12 may be used, or a drum consisting of a plurality of spaced circular plates placed at right angles to the direction of flow of the stream of mud fluid in ditch 8 may be used to increase the effective electrode area. In such an arrangement, a plurality of scrapers will be positioned between the individual plates and adapted to continuously scrape off the colloidal matter which will deposit on both faces of each of the plates. It will also be understood that the mud fluids may be subjected to a gravity settling treatment prior to passage through an electric field, as herein described, in order that at least some of the foreign matter may be settled out of the fluids without requiring electric treatment.

Additional alterations and modifications may be made in the details of apparatus and process steps of this invention without departing from the scope of the appended claims.

What we claim and desire to secure by Letters Patent is:

1. The method of controlling the properties of drilling fluid containing colloidal and non-colloidal matter which comprises, reducing the viscosity of said fluid by selectively removing colloidal matter therefrom by electrophoresis, thereafter separating and removing non-colloidal matter from said fluid, and admixing with the resulting fluid previously removed colloidal matter to thereby increase the viscosity of said fluid.

2. The method of controlling the properties of drilling fluid containing colloidal and non-colloidal matter which comprises, subjecting said fluid to an electric field, separating said fluid into colloidal and non-colloidal portions by resulting electrophoresis, and selectively removing controlled quantities of one or the other of said portions from said fluid to thereby control the properties of said fluid.

3. The method of controlling the viscosity of drilling fluid containing viscosity producing matter therein which comprises, separating a drilling fluid by electrophoresis into a relatively high viscosity portion and a relatively low viscosity portion, removing foreign matter from the latter to purify same, and admixing controlled quantities of the purified portion and of the relatively high viscosity portion to thereby produce a drilling fluid of the desired viscosity.

4. The method of controlling the salt water content of drilling fluids which comprises, subjecting a drilling fluid containing salt water to electrophoretic treatment to thereby separate said fluid into a portion having relatively low salt water content and a portion consisting largely of salt water, discarding the latter from the system and replacing same in the system with relatively pure water.

5. The method of controlling the properties of drilling fluids containing electrically charged colloidal particles and foreign matter in suspension therein which comprises, flowing a stream of said drilling fluid through an electric field created between spaced electrodes immersed in said fluid, controlling the direction of said field relative to the sign of the charge on said colloidal particles whereby said colloidal particles are caused to deposit selectively on one of said electrodes to thereby separate said colloidal particles from non-colloidal portions of said fluid which will contain said foreign matter, removing said foreign matter from said non-colloidal portions of said fluid to purify the latter, and re-mixing with the resulting purified portions of the fluid previously separated colloidal particles.

6. In the art of drilling wells, the method of purifying a drilling mud consisting of an aqueous suspension of colloidal clay particles and containing foreign matter which comprises, flowing said mud between spaced electrodes immersed therein, applying an electromotive force to said electrodes to thereby create an electric field through which said mud flows, separating said mud by resulting electrophoresis into a portion consisting largely of colloidal clay particles and a portion consisting of an aqueous phase containing said foreign matter, separating said foreign matter from said aqueous phase, and admixing the purified aqueous phase with the previously separated colloidal clay particles to produce a purified drilling mud.

7. In the art of drilling wells, the method of purifying a mud fluid consisting of an aqueous suspension of colloidal clay particles and containing dissolved and suspended foreign matter which comprises, dividing said fluid by electrophoresis into a first portion containing said colloidal clay particles and an aqueous portion containing said dissolved and suspended foreign matter, separating said suspended foreign matter from said aqueous portion, discarding from the system said suspended foreign matter and at least a portion of said aqueous portion containing said dissolved foreign matter, replacing the latter with relatively pure aqueous fluid to thereby purify said aqueous portion of said mud fluid, and admixing the latter with said first portion containing said colloidal clay particles to thereby produce a purified mud fluid.

8. The method of controlling the properties of a mud fluid used in wells which comprises, establishing a cyclic flow of mud fluid containing colloidal matter in suspension therein into and out of a well, subjecting said mud fluid at one point in said cyclic flow after leaving said well to an electrophoretic treatment to thereby separate said mud fluid into a relatively colloidal portion and a relatively non-colloidal portion, subjecting said relatively non-colloidal portion to a purifying treatment at another point in said cyclic flow, and recombining the purified non-colloidal portion with the separated colloidal portion at another point in said cyclic flow prior to the entrance thereof into said well.

9. The method of controlling the properties of a mud fluid used in wells which comprises, establishing a cyclic flow of mud fluid of a given viscosity value into and out of a well wherein foreign matter is introduced into said fluid, subjecting said mud fluid at a point in said cyclic flow after leaving said well to an electrophoretic treatment to thereby remove relatively high viscosity colloidal matter therefrom and reduce the viscosity thereof, subjecting the reducing viscosity fluid to a gravity settling treatment at another point in said cyclic flow to remove said foreign matter therefrom, and thereafter restoring the mud fluid to its initial viscosity value before returning said fluid into said well.

JOHN T. HAYWARD.
EARL E. HUEBOTTER.